Patented July 3, 1934

1,964,814

UNITED STATES PATENT OFFICE 1,964,814

PROCESS FOR THE TREATMENT OF COFFEE FOR THE PURPOSE OF EXPELLING THE CAFFEINE

Pierre Gilbert, Paris, France

No Drawing. Application November 21, 1933, Serial No. 698,990. In France February 15, 1933

2 Claims. (Cl. 99—11)

A coffee bean consists of two halves separated from each other by a longitudinal furrow. In its natural state, coffee contains free caffeine as well as salts of caffeine such as caffeine tannates. Caffeine is a substance exercising a marked action on the heart and may be injurious to health. Attempts have, therefore, been made to remove the caffeine from the coffee while allowing the latter to retain its natural qualities such as its flavour and aroma, properties so prized in infusions prepared from it.

According to the processes in vogue up till now, the coffee beans are treated in the following manner;

(a) the two halves of the bean are separated by an absorption process, the coffee being treated with steam vapour under pressure;

(b) caffeine in its free state is a weak base. On the other hand, the tannates of caffeine are weak salts, as being the salts derived from caffeine (a weak base) and tannic acid (a weak acid).

The coffee bean is, therefore, subjected to the action:

(1) of ammoniate either of sodium or of the alkaline carbonates, etc. or of an excess of acid for the purpose of decomposing the caffeine salts and liberating the caffeine which can then be readily eliminated;

(2) of an organic solvent such as ethyl ether or one of the ethers of the oily series, acetone or the chlorated organic derivatives, chloroforms, ethyl chloride, etc.; the solvent carries off the caffeine, which may be recovered afterwards.

In this way there is obtained a coffee bean drenched with a solvent and the coffee is separated from the solvent by heating or by air-treatment.

The coffee bean is then closed again by roasting it and the coffee so produced is freed from the greater part of the caffeine and is more or less aromatized.

Such processes as those described labour, however, under certain disadvantages;

1. The inflation of the bean under the action of steam vapour is a very slow process;

2. The coffee bean deteriorates under the high pressures it is subjected to;

3. The coffee bean becomes cooked by the vapour in question and this impedes the extraction of the caffeine;

4. The water and the solvents abstract a portion of the aromatic essences of the coffee;

5. The alkaline carbonates in combination with certain essential ingredients of the coffee yield substances of a disagreeable taste and more particularly, amines with ammonium;

6. The solvents which are frequently slow in volatilizing, impart an objectionable flavour to the coffee.

All these are serious drawbacks which detract from the commercial value of the coffee.

Moreover, from the industrial standpoint, these processes for treating the coffee are expensive and also fraught with danger owing to the risk of ignition on the parts of the solvents employed.

The object of the present invention is to remedy these various inconveniences and the invention accordingly relates to a process for eliminating the caffeine from the coffee beans, a process based on a principle entirely different from the foregoing ones, the characteristic feature of the present process being that the beans are treated with oxygenized water so as to make them swell and also to effect the decomposition of the caffeine tannates, the bean being subsequently treated with a caffeine solvent.

The invention comprises also the employment of dichloromethane as the caffeine solvent in the foregoing process or in any other process intended to separate the caffeine from the coffee.

In the process according to the invention, the treatment of the coffee may, for example, be carried out in the two stages indicated below;

*1st operation*—The coffee beans are swollen by being immersed in oxygenized water, more or less dilute. This operation is carried out cold and at atmospheric pressure.

The oxygenized water, $H_2O_2$, in contact with the bean, releases the nascent oxygen in the form of very fine bubbles, which causes the oxygen-charged water to penetrate into the interior of the coffee bean. Osmosis serves to inflate the bean and, after the immersion, the bean has doubled its volume by absorbing its own weight of water.

This novel use of oxygenized water is attended with numerous advantages;

(a) the inflation of the bean takes place very rapidly;

(b) the water penetrates thoroughly into the inner recesses of the bean, a condition absolutely essential if the chemical action of the oxygenized water on the tannates of caffeine is to be as complete as possible and in order that the caffeine set free may be dissolved by the solvent;

(c) the oxygenized water is devoid of taste, has no toxic action and allows the coffee to retain all its desirable properties;

(d) slow hydrolysis of the caffeine salts is set up, causing decomposition of the caffeine tannates, salts which dissociate readily.

*2nd operation*—The caffeine is abstracted from the coffee bean.

To this end the inflated beans are treated with a caffeine solvent, dichloromethylene or, preferably, dichloromethane, $CH_2Cl_2$; the coffee beans are then separated from the solvent by any one of the known processes.

The employment of dichloromethylene as solvent agent is attended with great advantages;

(a) it evaporates with great readiness as it boils at approximately 40° C;

(b) it is non-inflammable; consequently, the industrial works in which the process is carried out may be set up in a large town without special authorization.

To sum up, therefore, it is possible, without any risk, to obtain a coffee from which the caffeine has been expelled and possessing no disagreeable flavour, as the oxygenized water is itself without flavour and the solvent (dichloromethane) is readily separated from the coffee. Furthermore, the coffee, which has been subjected neither to high pressure nor to excessive variations in pressure, has retained, in perfection, its special taste, its peculiar flavour and its natural form.

What I claim as my invention and desire to secure by Letters Patent is:—

1. Process for the elimination of the caffeine from coffee beans, consisting in immersing the coffee beans in hydrogen peroxide, in subjecting the said coffee beans to the action of a caffeine solvent and in separating the coffee beans from the said solvent.

2. Process for the elimination of the caffeine from coffee beans, consisting in immersing the coffee beans in hydrogen peroxide, in subjecting the said coffee beans to the action of dichloromethane, which is a caffeine solvent and in separating the coffee beans from the dichloromethane.

PIERRE GILBERT.